(12) United States Patent
Sawata

(10) Patent No.: US 9,370,889 B2
(45) Date of Patent: Jun. 21, 2016

(54) COSMETIC MATERIAL CONTAINER AND MANUFACTURING METHOD OF THE SAME

(75) Inventor: Yasuhiro Sawata, Kawaguchi (JP)

(73) Assignee: TOKIWA CORPORATION, Gifu (JP)

( * ) Notice: Subject to any disclaimer, the term of this patent is extended or adjusted under 35 U.S.C. 154(b) by 815 days.

(21) Appl. No.: 13/589,272

(22) Filed: Aug. 20, 2012

(65) Prior Publication Data
US 2013/0048658 A1 Feb. 28, 2013

(30) Foreign Application Priority Data
Aug. 30, 2011 (JP) .................................. 2011-187651

(51) Int. Cl.
| | |
|---|---|
| *B29C 45/26* | (2006.01) |
| *A45D 34/00* | (2006.01) |
| *A45D 40/00* | (2006.01) |
| *A45D 40/18* | (2006.01) |
| *A45D 40/26* | (2006.01) |
| *B29L 31/00* | (2006.01) |

(52) U.S. Cl.
CPC .............. *B29C 45/261* (2013.01); *A45D 34/00* (2013.01); *A45D 40/0081* (2013.01); *A45D 40/18* (2013.01); *A45D 40/26* (2013.01); *A45D 2040/0012* (2013.01); *A45D 2200/051* (2013.01); *B29L 2031/718* (2013.01)

(58) Field of Classification Search
CPC .............. A45D 40/20; A45D 2200/05; A45D 2200/51; A45D 2040/0025
USPC .................. 220/780, 784, 786; 401/49, 88, 98
See application file for complete search history.

(56) References Cited

U.S. PATENT DOCUMENTS

| | | | | |
|---|---|---|---|---|
| 4,417,827 | A | * 11/1983 | Kasai et al. | ...................... 401/98 |
| 5,865,550 | A | * 2/1999 | Bouix | .................... A45D 40/06 |
| | | | | 401/78 |
| 2001/0027796 | A1* | 10/2001 | Bouix | .......................... 132/318 |

FOREIGN PATENT DOCUMENTS

| | | |
|---|---|---|
| JP | H06-15 Y2 | 1/1994 |
| JP | 3856860 B2 | 12/2006 |

\* cited by examiner

*Primary Examiner* — Mark A Laurenzi
*Assistant Examiner* — Bradley Oliver
(74) *Attorney, Agent, or Firm* — Bacon & Thomas, PLLC

(57) ABSTRACT

A container main body and a cap are stably and detachably engaged while improving a productivity. A leading end portion of a tubular container main body is provided with one or more projection portion on an outer peripheral surface, a hole communicating inner and outer sides of a tube in a rear side in an axial direction of the projection portion, and an expanded portion expanded such that an outer diameter within the tube is equal to or more than an outer diameter of the projection portion and running to a rear side in a rear side in an axial direction of the hole, respectively. An inner peripheral surface of a cap is provided with an annular projection detachably engaging with disengaging from the projection portion in an axial direction. The projection portion securely climbs over the annular projection for its flexibility in a diametrical direction of the hole.

4 Claims, 15 Drawing Sheets

COSMETIC MATERIAL CONTAINER AND MANUFACTURING METHOD OF THE SAME

BACKGROUND OF THE INVENTION

1. Field of the Invention

The present invention relates to a cosmetic material container for applying a cosmetic material and a manufacturing method of the same.

2. Description of the Conventional Art

Conventionally, as a structure in which a cap is detachably engaged with a container main body having a cosmetic material, for example, a rod-like cosmetic material or the like, the Japanese Utility Model Publication No. H6-15 and Japanese Patent No. 3856860 have been known.

An engaging structure of a cosmetic material container described in the Japanese Utility Model Publication No. H6-15 is frequently employed in the case that the container is made of a metal. In a container main body formed as a cylindrical shape, a protruding portion is provided in a protruding manner at a plurality of positions of an outer peripheral surface of a peripheral wall of the container main body, and an elastic protruding portion having an elasticity in an internal direction so as to deflect is formed by piercing a pair of slits which extend in an axial direction so as to communicate between inner and outer sides of the container, in both sides in a peripheral direction of the protruding portion. On the other hand, in a cap which is formed as a closed-end cylindrical shape, it is structured such that a fitting step portion coming to a concave portion which can be engaged with the protruding portion in an axial direction is provided annularly in an inner peripheral surface of the cap. If the cap is installed with respect to the container main body, the elastic protruding portion of the container main body deflects in an internal direction, the protruding portion enters into the fitting step portion of the cap and the elastic protruding portion restores, whereby the cap engages with the container main body. On the other hand, if the cap is pulled out of the container main body, the elastic protruding portion of the container main body deflects in the internal direction, the protruding portion is detached from the fitting step portion of the cap, and the engagement of the cap with respect to the container main body is released.

Further, an engagement structure of a cosmetic material container described in the Japanese Patent No. 3856860 is frequently employed in the case that the container is made of a resin. In a container main body formed as a cylindrical shape, it is provided with a cylindrical internal device which constructs an outer peripheral side of the container main body, and one streak of annular rib is provided in a protruding manner along an outer peripheral surface of a peripheral wall of the internal device. On the other hand, in a cap formed as a closed-end cylindrical shape, an inner peripheral surface of the cap is provided with one streak of annular groove which can engaged with the annular rib in an axial direction. If the cap is inserted into and detached from the container main body, the annular gap of the cap and the annular rib of the container main body engage and disengage in the axial direction, whereby the cap is attached to and detached from the container main body.

In this case, in order to obtain the engagement structure of the container main body described in the Japanese Utility Model Publication No. H6-15, it is general that a cylinder body coming to the container main body is formed by pressing, the slit is formed by piercing the cylinder body, and the protruding portion is formed by pressing from an inner side of the cylinder body.

Further, in order to obtain the engagement structure of the container main body described in the Japanese Patent No. 3856860, there is employed an injection molding by a resin which uses an outer die having an inner peripheral surface corresponding to an outer surface of the container main body, particularly having an annular concave portion corresponding to the annular rib of the container main body, however, since the engagement portion comes to a forced release, it is general to use a split mold which can be released in a diametrical direction for the outer die.

SUMMARY OF THE INVENTION

Problem to be Solved by the Invention

However, it is necessary to press at a plurality of times, in the former, and it is necessary to manufacture by using the split mold for avoiding the forced release, in the latter. In any case, there is a problem that it is complicated and troublesome to manufacture.

Accordingly, an object of the present invention is to provide a cosmetic material container which can stably and detachably engage a container main body and a cap of the cosmetic material container while being easily manufactured and improving a productivity, and a manufacturing method of the same.

Means for Solving the Problem

In accordance with the present invention, there is provided a cosmetic material container comprising:

a tubular container main body having a leading end portion in which a cosmetic material appears from an opening in a leading end thereof; and a closed-end tubular cap which is detachably engageable with the container main body in such a manner as to cover the leading end portion, wherein the leading end portion of the container main body is provided with a projection portion which is provided at least one on an outer peripheral surface and protrudes outward, a hole which is provided in adjacent to a rear side in an axial direction of the projection portion, and communicates inner and outer sides of the tube, and an expanded portion which is provided in adjacent to a rear side in the axial direction of the hole, and is expanded rearward such that inner and outer diameters of the tube are equal to or more than an outer diameter of the projection portion, the cap is provided with an annular projection which is detachably engageable with the projection portion in the axial direction, on an inner peripheral surface in the vicinity of an opening thereof, the leading end portion of the container main body is inserted to the opening of the cap, and the leading end portion is inserted to a position at which the projection portion of the container main body climbs over the annular projection of the cap, whereby the cap is detachably engaged with and installed to the container main body.

In accordance with the cosmetic material container mentioned above, since the container main body of the cosmetic material container is structured as mentioned above, the following forming method can be employed. In other words, for example, the method employs an outer die for forming an outer peripheral surface and an opening of a container main body, and an inner die for forming an inner peripheral surface of the container main body, the outer die is formed as a tubular body in which one end is opened and another end is closed, and is structured such as to include a concave portion for forming an outer surface of the projection portion, an expanded portion inner surface for forming an outer surface of the expanded portion while being away rearward from a rear end of the concave portion, and a hole corresponding inner surface between the concave portion and the expanded portion inner surface, the inner die is formed as a columnar body, and is structured such as to be provided in an outer peripheral surface thereof with a convex portion for forming a hole while corresponding to the hole corresponding inner surface, and an expanded portion outer surface for forming an inner surface of the expanded portion following to a rear end of the convex portion, the inner die is inserted from the opening of the outer die, a rear side of the convex portion of the outer die and a front side of the convex portion of the inner die are brought into contact with each other in the axial direction, the hole corresponding inner surface of the outer die and the outer surface of the convex portion of the inner die opposed thereto are brought into contact with each other in a diametrical direction, and a molten resin is poured between the outer die and the inner die in this state so as to be solidified, whereby the projection portion is formed on the basis of a contact in the axial direction between the rear side of the concave portion of the outer die and the front side of the convex portion of the inner die, and the hole is formed on the basis of a contact in the diametrical direction of the hole corresponding inner surface of the outer die and the outer surface of the convex portion of the inner die opposed thereto. Since the concave portion, the hole corresponding inner surface and the expanded portion inner surface are arranged in this order from the front side toward the rear side, in the inner peripheral surfaced of the outer die, by releasing the outer die and the inner die in an opposite direction to the axial direction, specifically, moving the outer die to the front side and moving the inner die to the rear side so as to release, the inner peripheral surface of the outer die does not interfere (come into contact) with a formed product. Further, in the outer peripheral surface of the inner die, since the expanded portion outer surface and the convex portion are arranged side by side from the rear side toward the front side, the outer peripheral surface does not interfere with the formed product at a time of moving the inner die to the rear side, and the container main body can be obtained. As mentioned above, since the forced release is not carried out, the split mold is not used, and of course, the press is not necessary, it is easy to manufacture and it is possible to improve a productivity.

Further, in accordance with the structure mentioned above, since the projection portion which is provided at least one on the outer peripheral surface of the leading end portion of the container main body and protrudes outward is inserted to the position climbing over the annular projection which is provided on the inner peripheral surface in the vicinity of the opening of the cap, the cap is detachably engaged with the container main body in the axial direction, and the projection portion has the elasticity in the diametrical direction and can securely climb over the annular projection by the hole which is adjacent to the rear side of the projection portion and communicates the inner and outer sides of the tube, at a time of inserting and detaching the leading end portion to and from the cap. In accordance with this, it is possible to stably and detachably engage the container main body and the cap of the cosmetic material container.

In this case, if the projection portion of the container main body protrudes to the hole in its part, the elasticity in the diametrical direction of the projection portion is further enhanced, and can further securely climb over the annular projection. As a result, it is possible to further stably and detachably engage the container main body and the cap of the cosmetic material container.

Further, in the container main body, if a thickness of a front side portion of the projection portion is smaller than a thickness of the other portions in both sides in a peripheral direction of the front side portion, an elasticity in the diametrical direction of the projection portion is further enhanced, and can further securely climb over the annular projection. As a result, it is possible to further stably and detachably engage the container main body and the cap of the cosmetic material container.

Further, in accordance with the present invention, there is provided a manufacturing method of a cosmetic material container, the method forming an outer peripheral surface and an opening of a container main body by an outer die, and forming an inner peripheral surfaced of the container main body by an inner die, for forming the container main body of the cosmetic material container, wherein the outer die is formed as a tubular body in which one end is opened and another end is closed, and is structured such as to include a concave portion for forming an outer surface of a projection portion, an expanded portion inner surface for forming an outer surface of the expanded portion while being away rearward from a rear end of the concave portion, and a hole corresponding inner surface between the concave portion and the expanded portion inner surface, the inner die is formed as a columnar body, and is structured such as to be provided in an outer peripheral surface thereof with a convex portion for forming a hole while corresponding to the hole corresponding inner surface, and an expanded portion outer surface for forming an inner surface of the expanded portion following to a rear end of the convex portion, the inner die is inserted from the opening of the outer die, a rear side of the convex portion of the outer die and a front side of the convex portion of the inner die are brought into contact with each other in the axial direction for forming the projection portion, the hole corresponding inner surface of the outer die and the outer surface of the convex portion of the inner die opposed thereto are brought into contact with each other in a diametrical direction for forming the hole, a molten resin is poured between the outer die and the inner die in this state and is solidified, and thereafter the outer the and the inner the are released from each other in an opposite direction in the axial direction, whereby the container main body is obtained.

In accordance with the manufacturing method of the cosmetic material container as mentioned above, in the same manner as mentioned above, since the container main body can be obtained without any forced release, without using any split mold, and of course, without necessity of a press, it is easy to manufacture and it is possible to improve a productivity.

In this case, it is preferable that the container main body is manufactured by an injection molding.

Effect of the Invention

As mentioned above, in accordance with the present invention, it is possible to stably and detachably engage the container main body and the cap of the cosmetic material container while easily manufacturing and improving a productivity.

MODE FOR CARRYING OUT THE INVENTION

Figure 1:
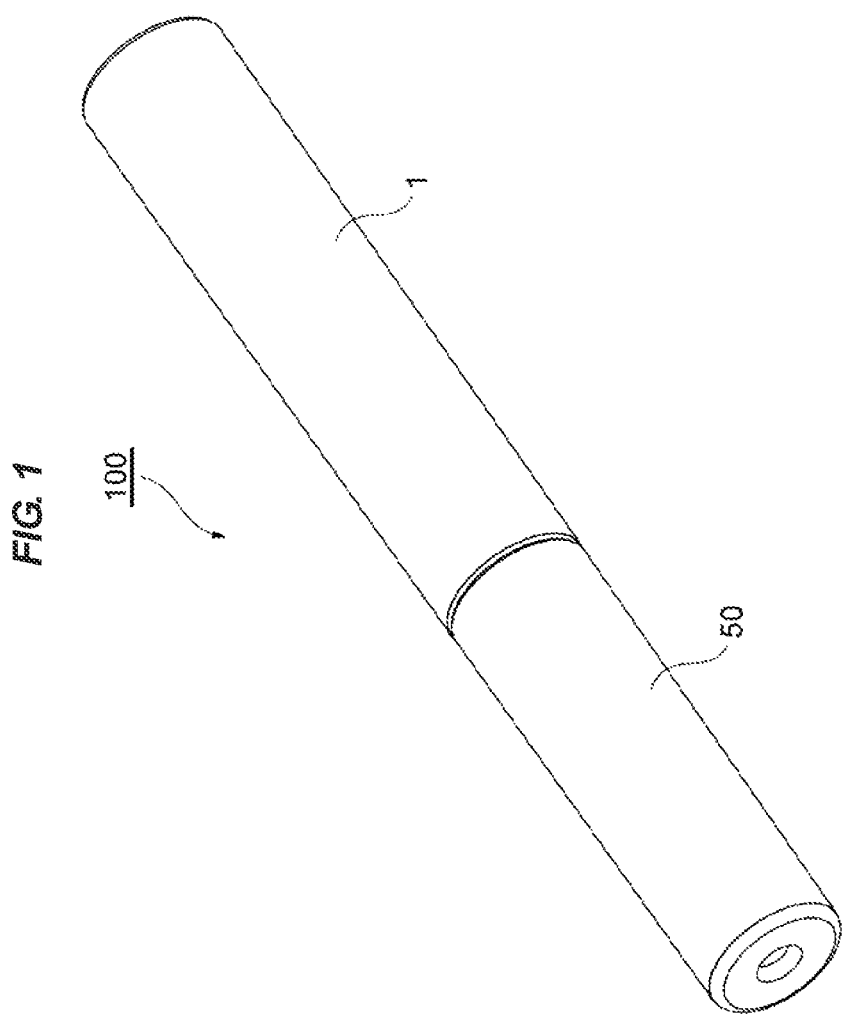
FIG. 1 is a perspective view showing an outer appearance of a cosmetic material container in accordance with a first embodiment of the present invention.

A description will be in detail given below of embodiments in accordance with the present invention with reference to the accompanying drawings. In this case, the same reference numerals are attached to the same or corresponding elements, and an overlapping description will be omitted.

Figure 13:
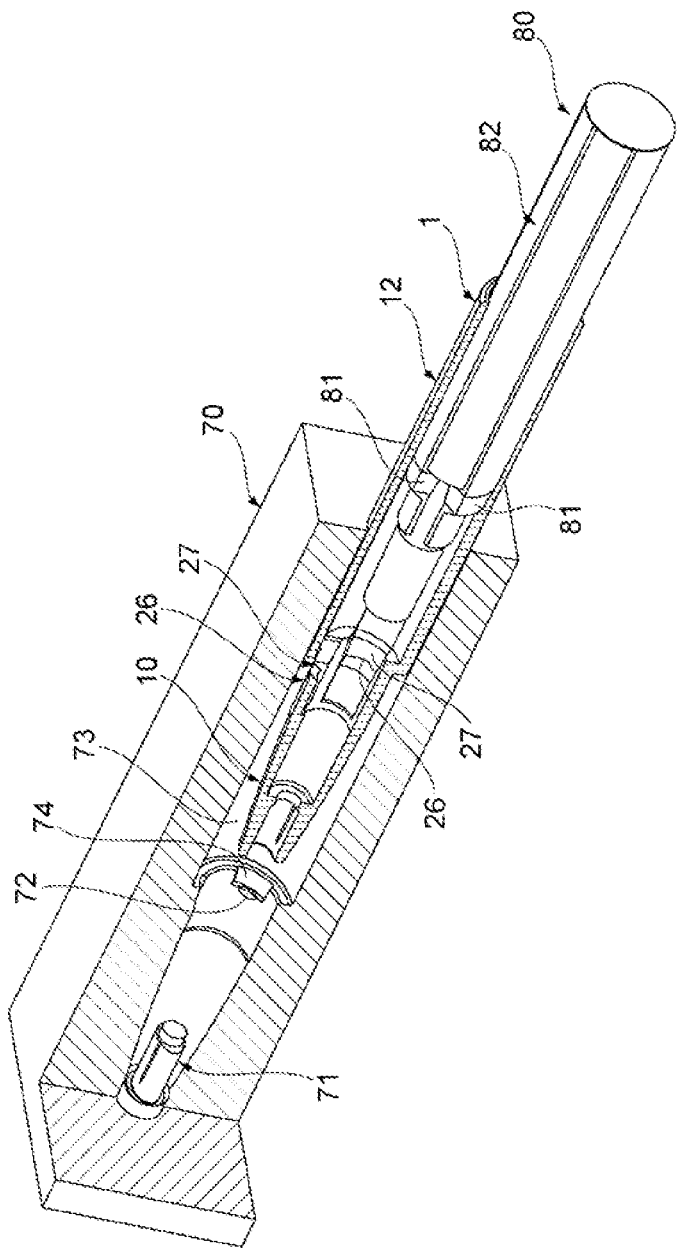
FIG. 13 is an exploded perspective view showing a state in which the metal mold is released from a state shown in FIG. 12.
Figure 14:
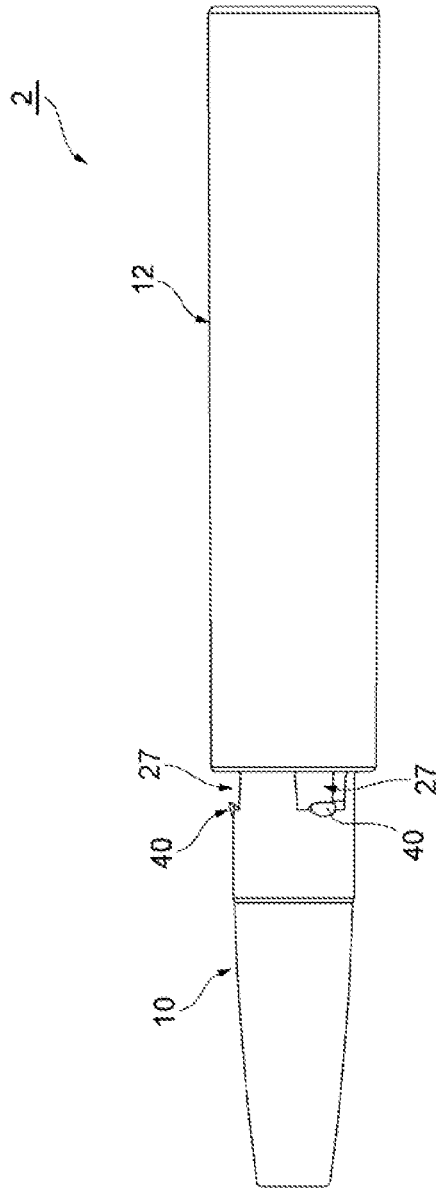
FIG. 14 is a side elevational view showing a container main body which constructs a cosmetic material container in accordance with a second embodiment of the present invention.
Figure 15:
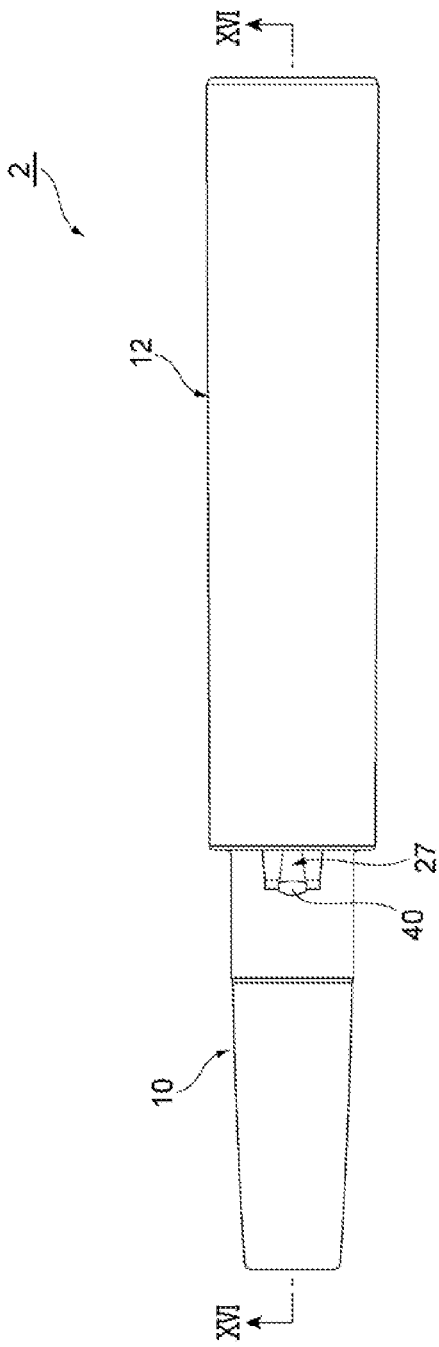
FIG. 15 is a plan view of the container main body shown in FIG. 14.
Figure 16:
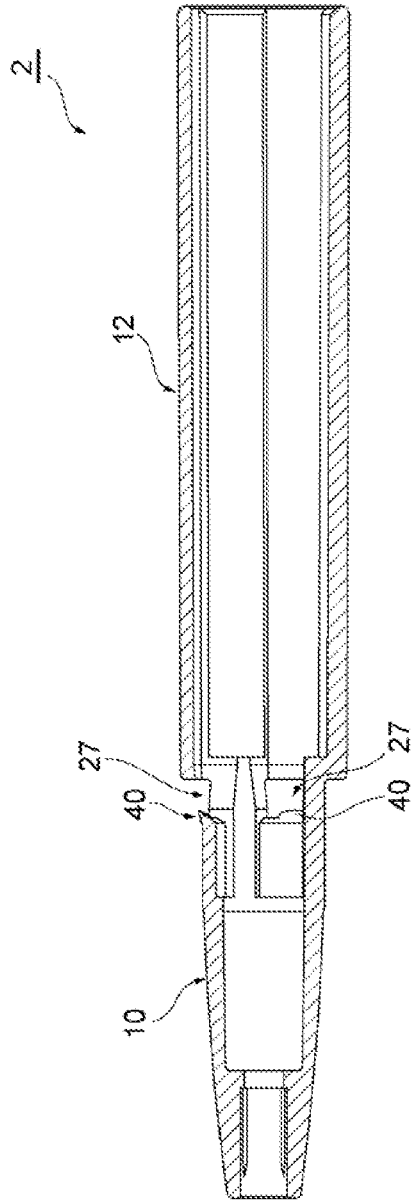
FIG. 16 is a view as seen from an arrow XVI-XVI in FIG. 15.
Figure 17:
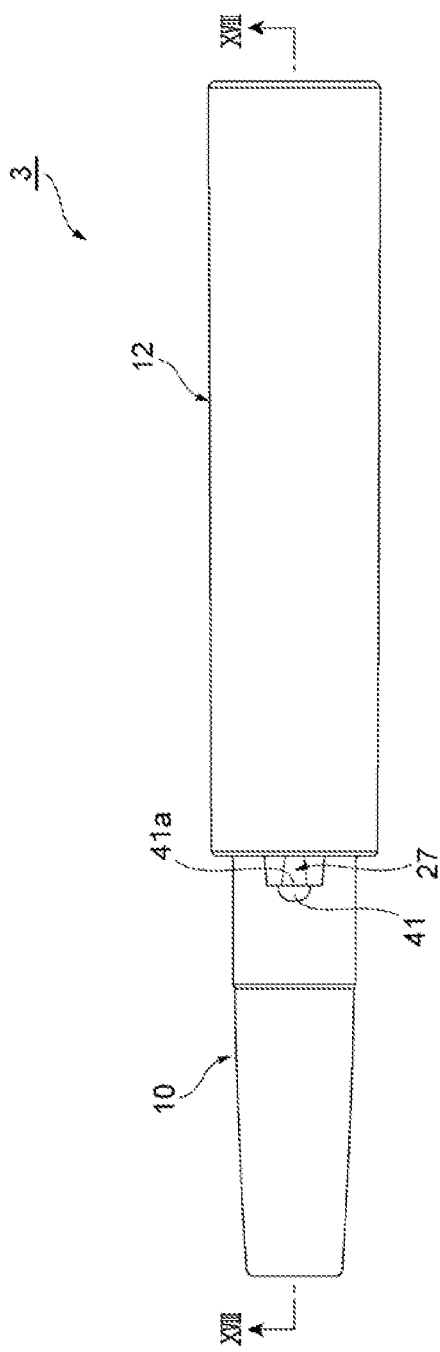
FIG. 17 is a plan view showing a container main body which constructs a cosmetic material container in accordance with a third embodiment of the present invention.
Figure 18:
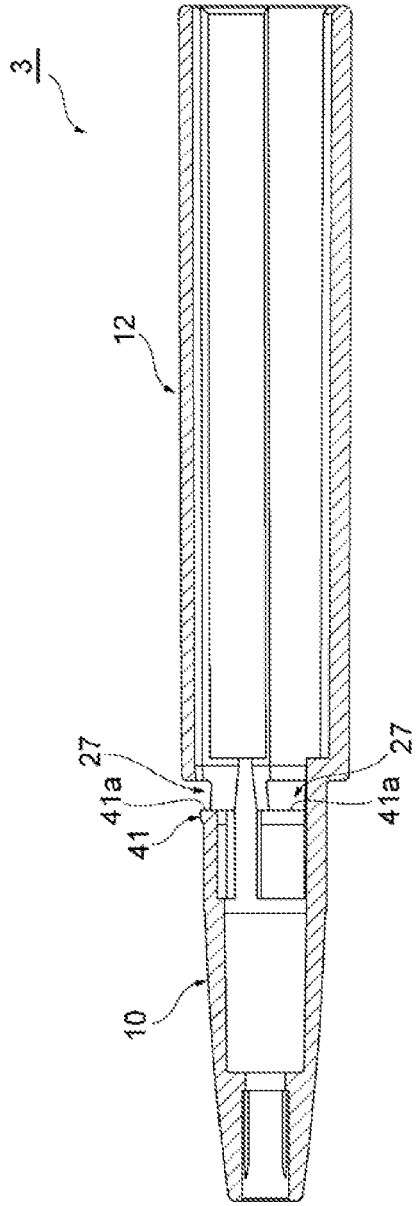
FIG. 18 is a view as seen from an arrow XVIII-XVIII in FIG. 17.
Figure 19:
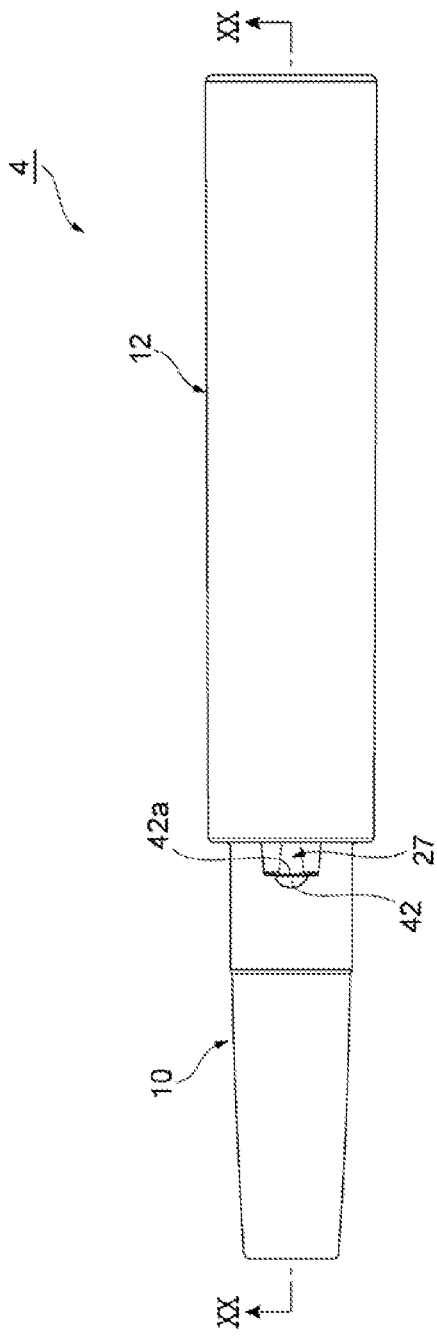
FIG. 19 is a plan view showing a container main body which constructs a cosmetic material container in accordance with a fourth embodiment of the present invention.
Figure 20:
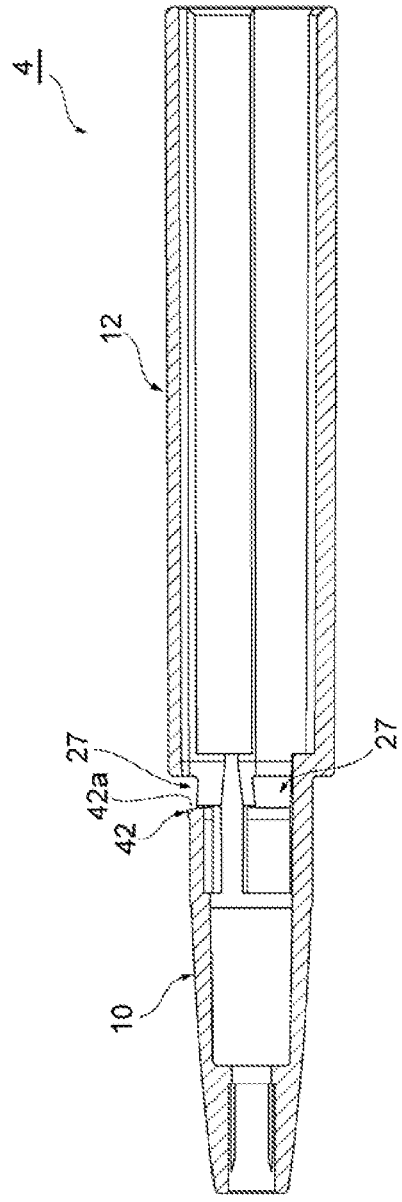
FIG. 20 is a view as seen from an arrow XX-XX in FIG. 19.
Figure 21:
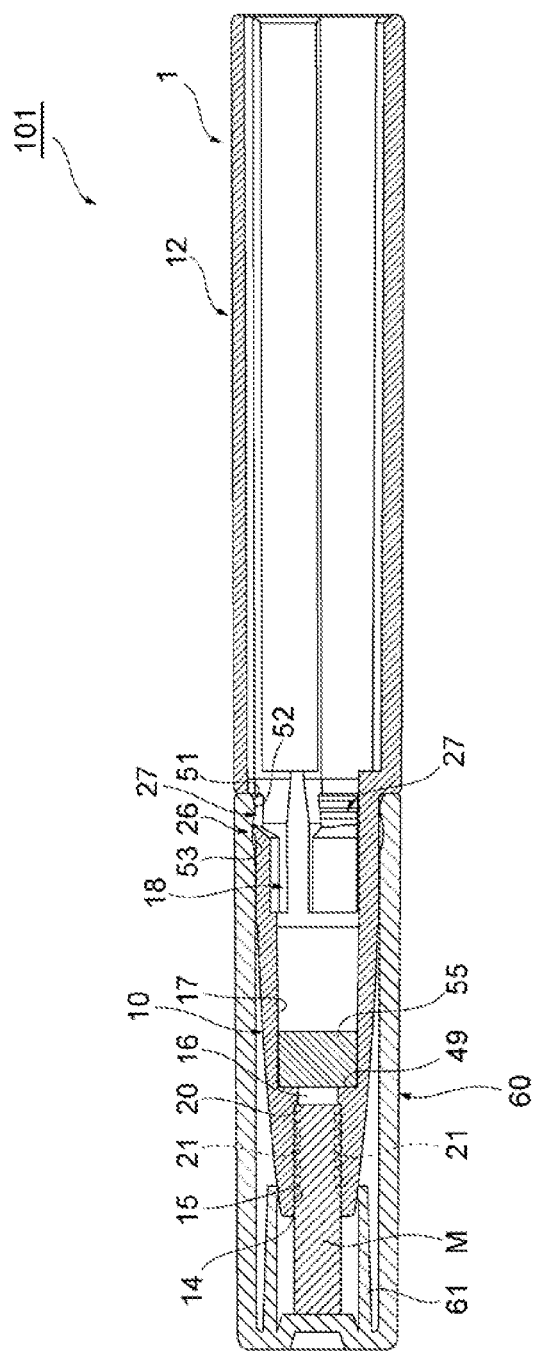
FIG. 21 is a vertical cross sectional view showing a cosmetic material container in accordance with a fifth embodiment of the present invention.

FIG. 1 to FIG. 13 show a first embodiment of the present invention, FIG. 14 to FIG. 16 show a second embodiment of the present invention, FIG. 17 and FIG. 18 show a third embodiment of the present invention, FIG. 19 and FIG. 20 show a fourth embodiment of the present invention, and FIG. 21 shows a fifth embodiment of the present invention, respectively, a description will be first of all given the first embodiment shown in FIG. 1 to FIG. 13.

Figure 2:
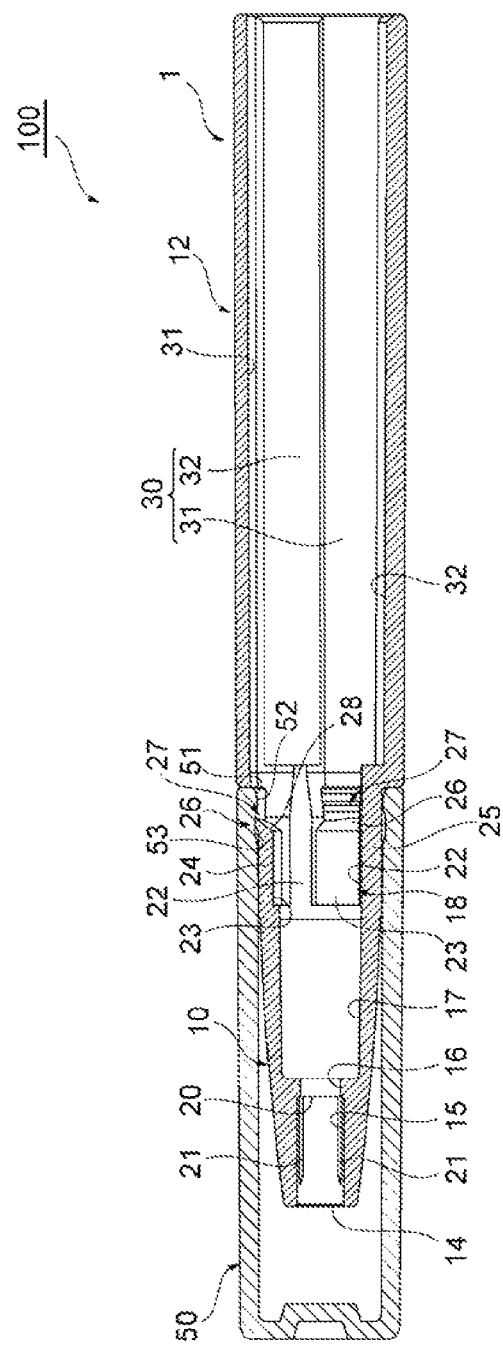
FIG. 2 is a vertical cross sectional view of the cosmetic material container shown in FIG. 1.
Figure 3:
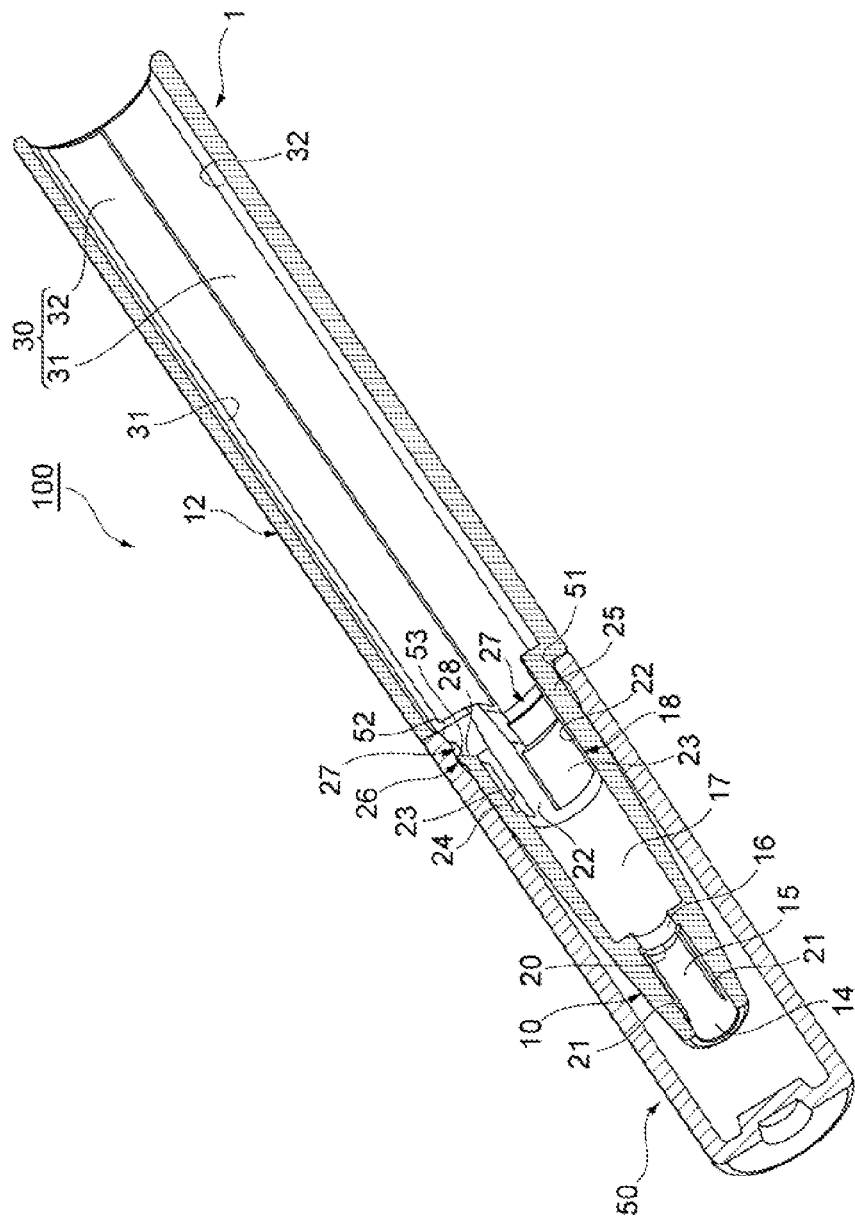
FIG. 3 is a vertical cross sectional perspective view of the cosmetic material container shown in FIG. 1.
Figure 4:
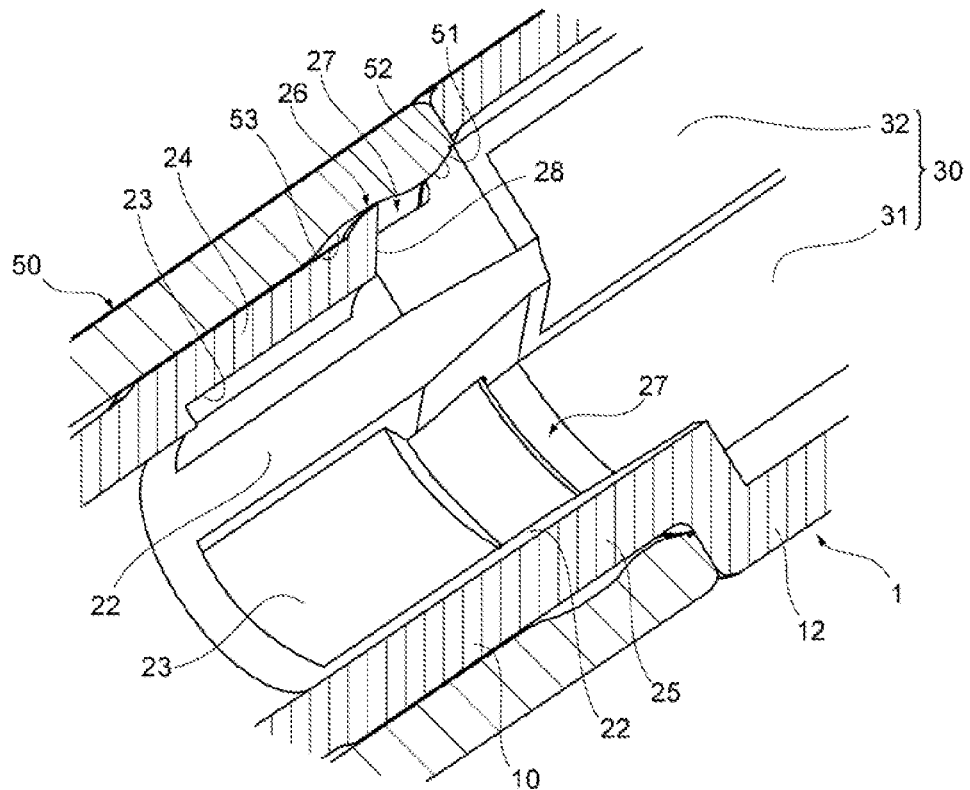
FIG. 4 is a vertical cross sectional perspective view showing a substantial part in FIG. 3 in an enlarged manner.
Figure 5:
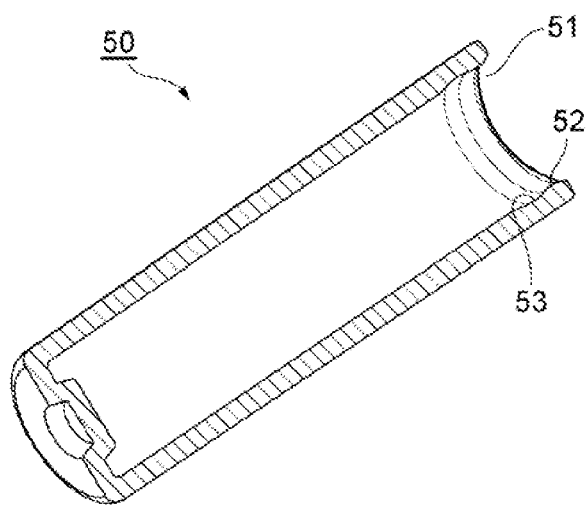
FIG. 5 is a vertical cross sectional perspective view showing a cap in FIG. 1 to FIG. 4.
Figure 6:
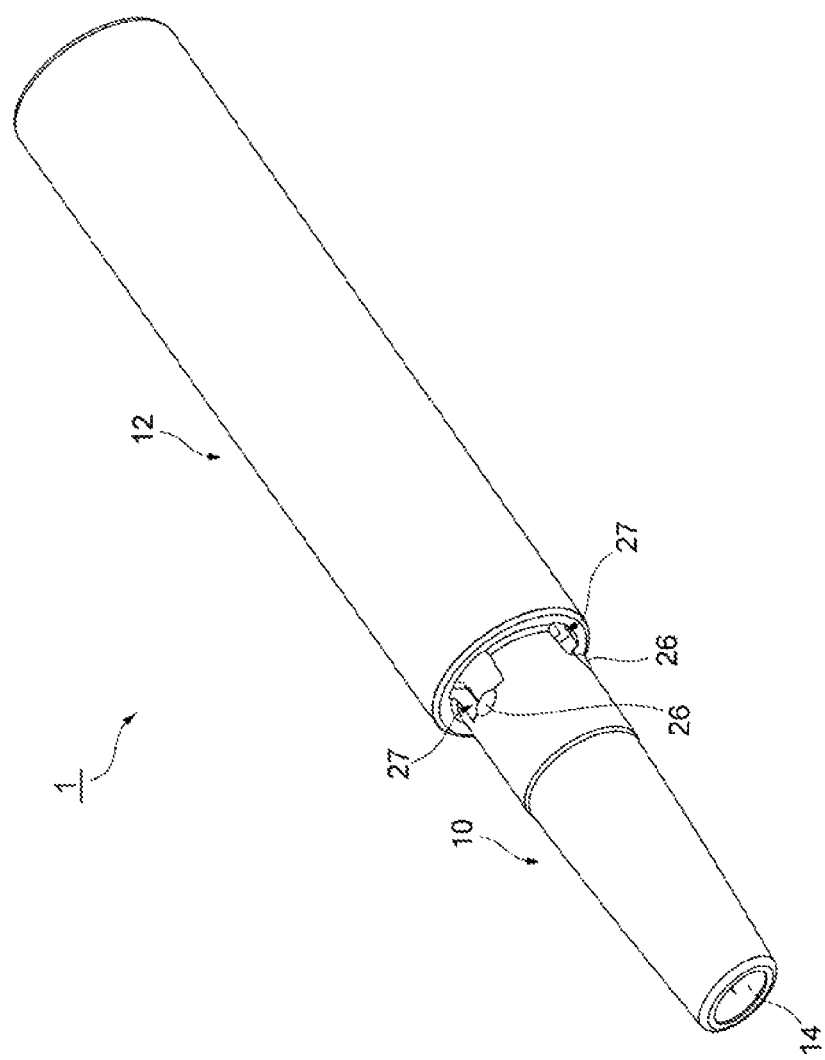
FIG. 6 is a perspective view showing a container main body in FIG. 1 to FIG. 4.
Figure 7:
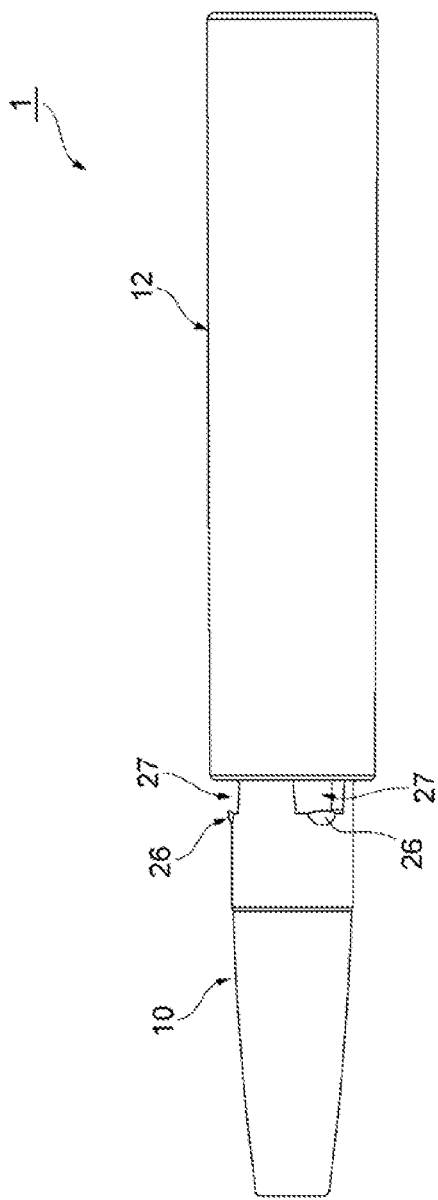
FIG. 7 is a side elevational view of the container main body shown in FIG. 6.
Figure 8:
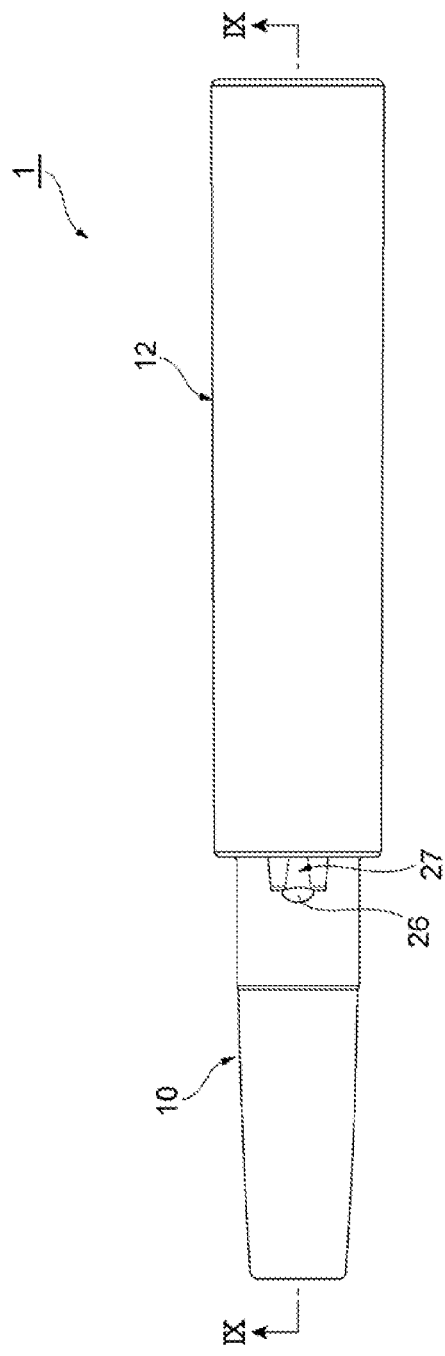
FIG. 8 is a plan view of the container main body shown in FIG. 7.
Figure 9:
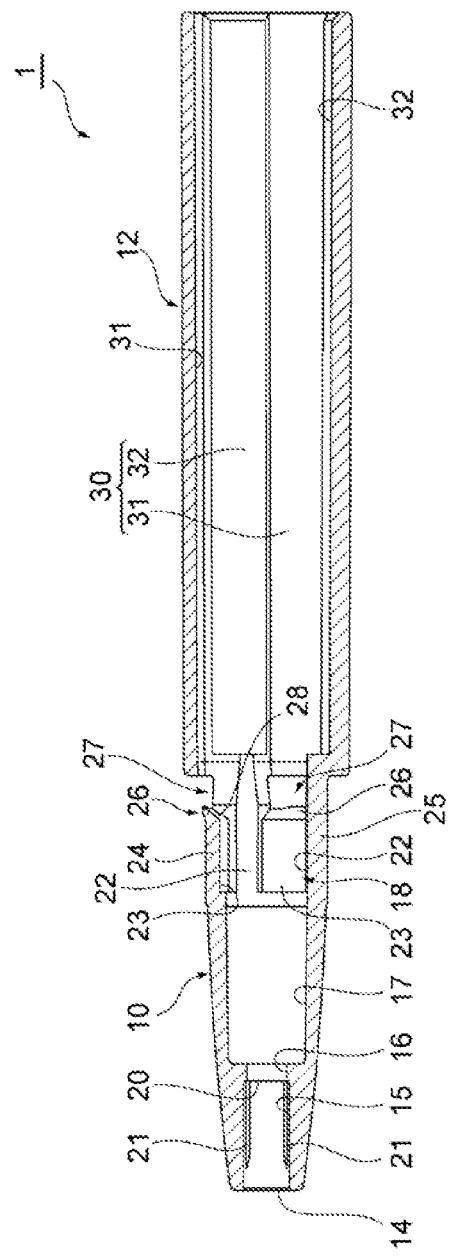
FIG. 9 is a view as seen from an arrow IX-IX in FIG. 8.

FIG. 1 is a perspective view showing an outer appearance of a cosmetic material container in accordance with the first embodiment, FIG. 2 to FIG. 4 are respective views showing the cosmetic material container, FIG. 5 is a vertical cross sectional perspective view showing a cap, FIG. 6 to FIG. 9 are respective views showing a container main body, and FIG. 10 to FIG. 13 are explanatory views showing a manufacturing method of the container main body. The cosmetic material container in accordance with the present embodiment is a cosmetic material container for applying a rod-like cosmetic material.

As shown in FIG. 1 to FIG. 3, a cosmetic material container 100 is approximately provided with a container main body 1 to which a rod-like cosmetic material M (refer to FIG. 21) is installed, and a cap 50 which is detachably installed to the container main body 1 so as to cover and protect the rod-like cosmetic material M, as an outer structure.

The container main body 1 is formed by a flexible material, for example, a synthetic resin or the like, and is constructed as a cylindrical shape which is open in both ends, as shown in FIG. 2, FIG. 3 and FIG. 6 to FIG. 9. A leading end portion 10 in a front half side (a left side in an illustration) of the container main body 1 is a portion for detachably engaging and installing the cap 50, and is formed as a cylindrical shape in which an outer diameter becomes smaller little by lithe toward a leading end, and a rear half portion following to a rear side via a step surface with respect to the leading end portion 10 is a grip portion 12 for gripping and holding at a time when a user employs, and is formed as an expanded portion in which inner and outer diameters are expanded with respect to the leading end portion 10.

In a tubular hole which passes through the container main body 1, a tubular hole in the leading end portion 10 is structured such that a first hole 15, a second hole 16, a third hole 17 and a fourth hole 18 run into the grip portion 12 in this order, from an opening 14 in the leading end.

The first hole 15 is a hole to which the rod-like cosmetic material M is inserted, runs into a rear side approximately at the same diameter from the opening 14, and a step surface 20 between a rear end of the first hole 15 and a front end of the second hole 16 having a smaller diameter is formed as an annular contact surface for bringing a rear end surface of the rod-like cosmetic material M into contact therewith. A plurality of ribs 21 for gripping the rod-like cosmetic material M extend in an axial direction and are provided along a peripheral direction, in an inner peripheral surface of the first hole 15. Further, the rod-like cosmetic material M is gripped and provided in the leading end portion 10 of the container main body 1 by bringing the rear end surface of the rod-like cosmetic material M into contact with the step surface 20 while inserting the rear end portion of the rod-like cosmetic material M from the opening 14 in the leading end to the ribs 4.

In this case, the first hole 15 is formed as a circular shape in a transverse cross section and is structured such as to grip the rod-like cosmetic material having a circular transverse cross sectional shape, in this case, however, may be, for example, formed as an oval shape in a transverse cross section and structured such as to grip the rod-like cosmetic material having an oval transverse cross sectional shape or a circular transverse cross sectional shape.

The second hole 16 is made shorter in an axial direction, and the third hole 17 following thereto is expanded with respect to the second hole 16 and extends rearward at a predetermined length.

The fourth hole 18 following to the third hole 17 is structured such that an inner surface 22 which has approximately the same diameter as the third hole 17 and runs to a rear side, and a large diameter inner surface 23 which is expanded with respect to the third hole 17 and runs to a rear side are alternately arranged along a peripheral direction. In this case, three inner surfaces 22 and three large diameter inner surfaces 23 are provided. Further, a tube portion 24 having the large diameter inner surface 23 as an inner surface is formed as a thin portion in which a thickness is made thin, and the other portion in the peripheral direction, that is, a tube portion 25 having the inner surface 22 as an inner surface is formed as a thick portion in which the thickness is made thick.

A projection portion 26 which protrudes outward is provided in an outer peripheral surface in a rear portion side of each of three thin portions 24 which are provided in the peripheral direction of the leading end portion 10, and a hole 27 which communicates inner and outer sides of the tube is provided at a position which is adjacent to a rear side in an axial direction of the projection portion 26 (a rear side of a base portion of the projection portion 26). A surface in a front side (a surface in a left side of an illustration) which forms the hole 27 is formed as an inclined surface 28 which is expanded in accordance with heading for a rear side, and the projection portion 26 is structured such as that a part thereof protrudes over a front end of the hole 27. More specifically, the projection portion 26 is structured such that a rear end portion heads for a rear side and heads for a diagonal direction which is away from an axis, so as to cover a front portion of the hole 27 and protrude like a visor to the hole 27.

The grip portion 12 following to the leading end portion 10 is an expanded portion in which inner and outer diameters are expanded with respect to the leading end portion 10, a portion 31 following to the rear side of the hole 27 in a tube hole 30 of the grip portion 12 is expanded in such a manner that an inner diameter thereof becomes the same diameter as an outer diameter of the projection portion 26 so as to run to a rear end, and a portion 32 following to the rear side of the inner surface 22 is expanded in such a manner that an inner diameter is somewhat smaller than the portion 31 and expanded more than the inner surface 22 so as to run to a rear end. In this case, the inner and outer diameters of the expanded portion 12 may be expanded to be equal to or more than the outer diameter of the projection portion 26.

The cap 50 is formed by a flexible member, for example, a synthetic resin or the like, and is constructed as a closed-end cylindrical shape, as shown in FIG. 2, FIG. 3 and FIG. 5. The cap 50 is provided in an inner peripheral surface in the vicinity of an opening 51 thereof with an annular projection 52 and an annular concave portion 53 for engaging with the projection portion 26 of the container main body 1 in an axial direction in this order from a rear side in the axial direction, and a convexo-concave portion is formed from a rear side in the axial direction by them.

Next, a description will be given of an injection molding method which is a manufacturing method of the container main body 1 having the structure mentioned above, and a forming mold which is a metal mold used therein with reference to FIG. 10 to FIG. 13.

Figure 10:
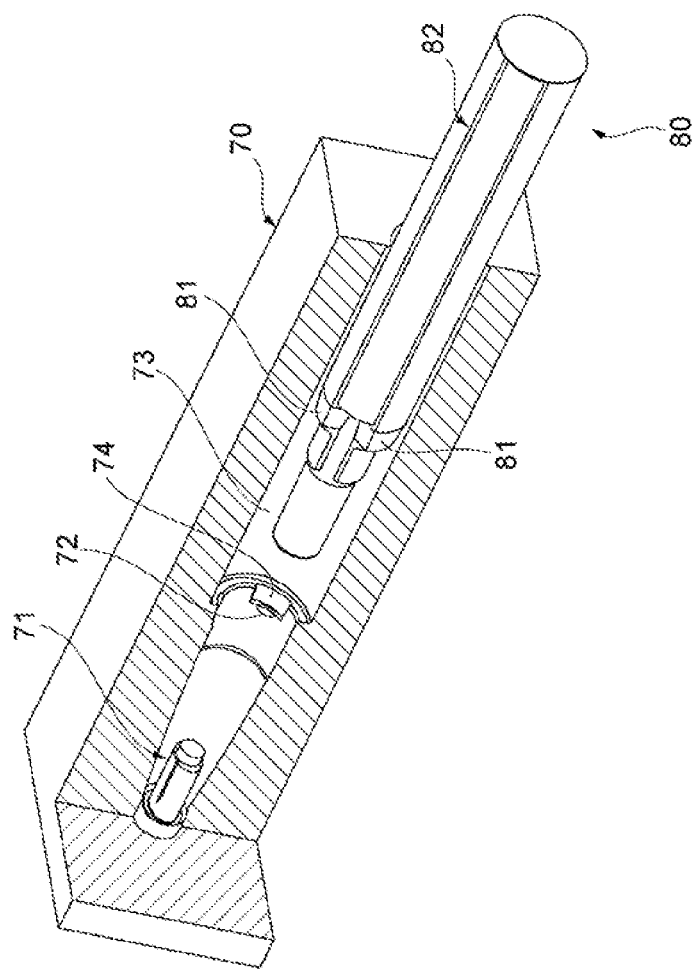
FIG. 10 is a cross sectional perspective view showing a metal mold for manufacturing the container main body in FIG. 6 to FIG. 9.
Figure 11:
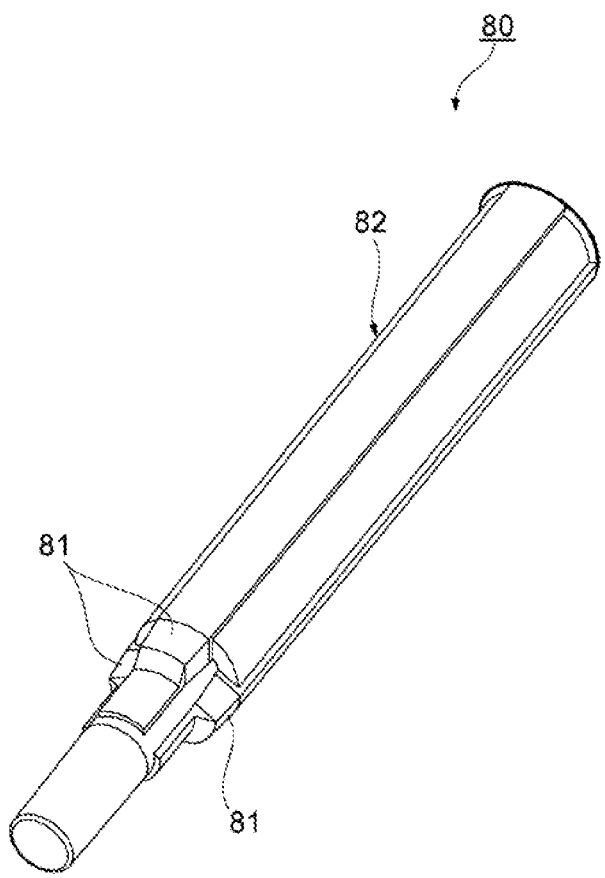
FIG. 11 is a perspective view showing an inner die in FIG. 10.

As a forming mold used here, as shown in FIG. 10 and FIG. 11, there are prepared an outer die 70 for forming an outer peripheral surface and the opening 14 of the container main body 1, and an inner die (also called as a core pin) for forming an inner peripheral surface of the container main body 1.

The outer die 70 is a tubular body in which one end (a right end in an illustration) is opened and another end (a left end in an illustration) is closed, as shown in FIG. 10. The outer die 70 is provided in a closed side with a stepped columnar body 71 for forming the opening 14, the first hole 15 and the second hole 16 of the container main body 1 in such a manner as to protrude toward a rear side. Further, the outer die 70 is structured such that the other inner peripheral surface than the stepped columnar body 71 corresponds to the outer peripheral surface of the container main body 1, and particularly includes a concave portion 72 for forming the projection portion 26 of the container main body 1, an expanded portion inner surface 73 which is away rearward from a rear end of the concave portion 72 and is provided for forming the outer surface of the expanded portion 12 of the container main body 1, and a hole corresponding inner surface 74 which is provided between the concave portion 72 and the expanded portion inner surface 73 and is provided for forming the hole 27 of the container main body 1.

An inner die 80 is formed as a columnar body as shown in FIG. 10 and FIG. 11, is structured such that an outer peripheral surface corresponds to the inner peripheral surface of the container main body 1, and particularly includes a convex portion 81 for forming the hole 27 of the container main body 1 in correspondence to the hole corresponding inner surface 74 of the outer die 70, and an expanded portion outer surface 82 which runs to a rear end of the convex portion 81 and is provided for forming the inner surface of the expanded portion 12 of the container main body 1.

Figure 12:
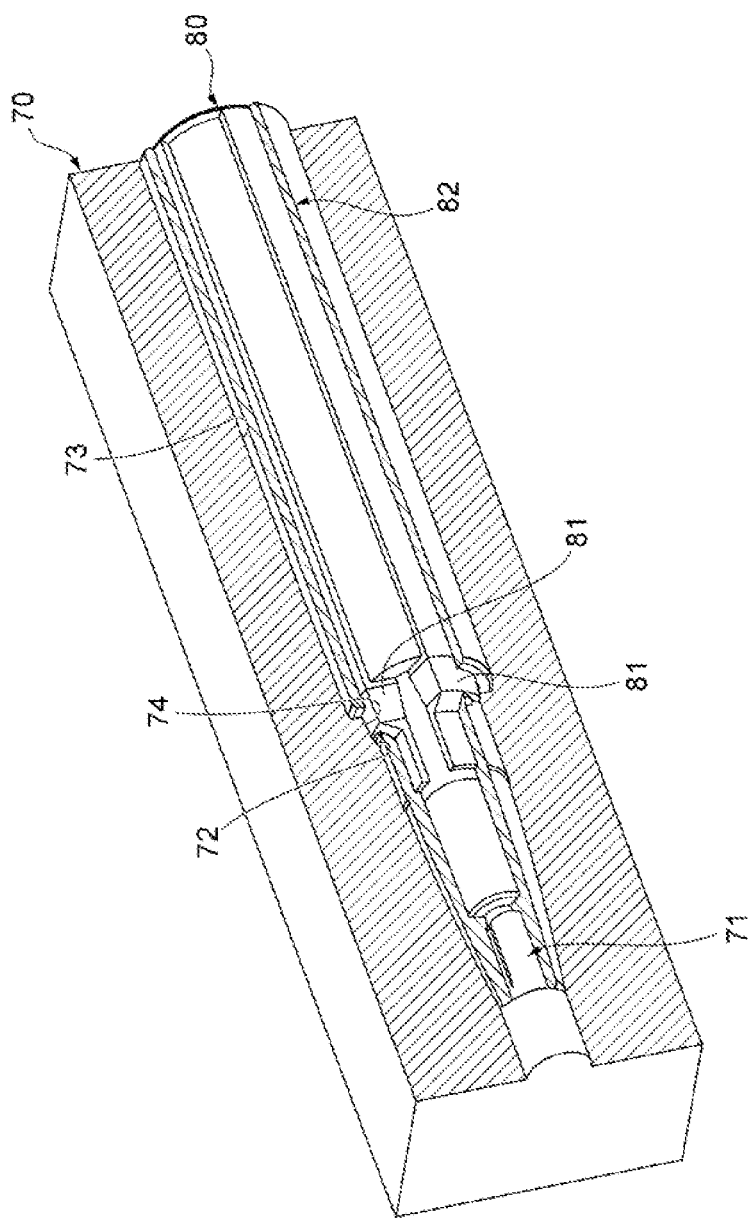
FIG. 12 is a vertical cross sectional perspective view showing a state in which the container main body is manufactured by using the metal mold in FIG. 10.

Further, the inner die 80 having the structure mentioned above is inserted from the opening of the outer die 70, as shown in FIG. 12, thereby bringing a rear side (a rear end edge) of the concave portion 72 of the outer die 70 into contact with a front side (a front end outer peripheral edge) of the convex portion 81 of the inner die 80 in the axial direction, and bringing the hole corresponding inner surface 74 of the outer die 70 into contact with an outer surface (a convex surface) of the convex portion 81 of the inner die 80 opposed thereto in a diametrical direction, and a molten resin is poured (injected) into a gap which is formed between the outer die 70 and the inner die 80 so as to be solidified.

The rear side of the concave portion 72 of the outer die 70 comes into contact with the front side of the convex portion 81 of the inner die 80 in the axial direction, whereby the projection portion 26 of the container main body 1 is formed as shown in FIG. 13, and the hole corresponding inner surface 74 of the outer die 70 comes into contact with the outer surface of the convex portion 81 of the inner die 80 opposed thereto in the diametrical direction, whereby the hole 27 of the container main body 1 is formed.

After the solidification, the outer die 70 and the inner die 80 are released from each other in opposite directions in the axial direction as shown in FIG. 13, specifically, the outer die 70 is moved to a front side (a left side in an illustration) and the inner die 80 is moved to a rear side (a right side in an illustration) so as to be released. In the inner peripheral surface of the outer die 70, since the concave portion 72, the hole corresponding inner surface 74 and the expanded portion inner surface 73 are arranged in this order from the front side toward the rear side, that is, are arranged in the order from the smaller diameter to the larger diameter, the inner peripheral surface of the outer die 70 does not interfere (comes into contact) with the outer peripheral surface of the container main body 1 which is a formed product at a time of moving the outer die 70 to the front side. Further, in the outer peripheral surface of the inner die 80, since the expanded portion outer surface 82 and the convex portion 81 are arranged in this order from the rear side toward the front side, that is, arranged in the order from the larger diameter to the smaller diameter, the outer peripheral surface of the inner die 80 does not interfere with the container main body 1 which is the formed product at a time of moving the inner die 80 to the rear side, and the container main body 1 can be obtained.

Accordingly, since the forced release is not carried out, the split mold is not used, and of course, the press is not necessary, it is easy to manufacture and it is possible to improve a productivity.

Further, in the case that the cap 50 mentioned above is installed to the container main body 1 which is manufactured as mentioned above, the leading end portion 10 of the container main body 1 is inserted to the opening 51 of the cap 50.

Accordingly, particularly as shown in FIG. 4, since the projection portion 26 of the container main body 1 has a flexibility in the diametrical direction by the hole 27 which is adjacent to the rear side of the projection portion 26 and communicates the inner and outer sides of the tube, it securely climbs over the annular projection 52 of the cap 50 so as to enter into the annular concave portion 53, and the projection portion 26 and the annular projection 52 are engaged in the axial direction. In accordance with this, the cap 50 is engaged with and installed to the container main body 1 in the axial direction.

Further, if the leading end portion 10 of the container main body 1 is drawn out with respect to the cap 50, the projection portion 26 having the flexibility in the diametrical direction by the hole 27 securely climbs over the annular projection 52 in the same manner as the installing case, and the engagement in the axial direction between the projection portion 26 and the annular projection 52 is cancelled. In accordance with this, the cap 50 is detached from the leading end portion 10 of the container main body 1 so as to be in a used state.

As mentioned above, in the present embodiment, the projection portion 26 of the container main body 1 is inserted to the position which climbs over the annular projection 52 in the inner peripheral surface of the cap 50, whereby the cap 50 is detachably engaged in the axial direction with respect to the container main body 1. At a time of inserting and detaching the leading end portion 10 to and from the cap 50, the projection portion 26 has the flexibility in the diametrical direction and can securely climb over the annular projection 52, by the hole 27 in the rear side of the projection portion 26. In accordance with this, it is possible to stably and detachably engage the container main body 1 and the cap 50.

Further, in the projection portion 26 of the container main body 1, since a part thereof protrudes to the hole, the flexibility in the diametrical direction of the projection portion 26 can be further enhanced. In accordance with this, it is possible to further securely climb over the annular projection 52. As a result, it is possible to further stably and detachably engage the container main body 1 and the cap 50.

Further, in the container main body 1, since the thickness of the front portion (the thin portion) 24 of the projection portion 26 is thinner than the thickness of the other portion (the thick portion) 25 in both sides in the peripheral direction of the front portion 24, the flexibility in the diametrical direction of the projection portion 26 can be further enhanced. In accordance with this, it is possible to further securely climb over the annular projection 52. As a result, it is possible to further stably and detachably engage the container main body 1 and the cap 50.

FIG. 14 is a side elevational view showing a container main body which constructs a cosmetic material container in accordance with a second embodiment of the present invention, FIG. 15 is a plan view of the container main body shown in FIG. 14, and FIG. 16 is a view as seen from an arrow XVI-XVI in FIG. 15.

A container main body 2 in accordance with the second embodiment is different from the container main body 1 in accordance with the first embodiment in a point that it employs a projection portion 40 which partly enters into the hole 27 and further protrudes like a visor to the hole 27, in place of the projection portion 26.

Even in the second embodiment having the structure mentioned above, it goes without saying that the same operations and effects as the first embodiment can be achieved.

FIG. 17 is a plan view showing a container main body which constructs a cosmetic material container in accordance with a third embodiment of the present invention, and FIG. 18 is a view as seen from an arrow XVIII-XVIII in FIG. 17.

A container main body 3 in accordance with the third embodiment is different from the container main body 1 in accordance with the first embodiment in a point that it employs a projection portion 41 which extends vertically (extends vertically with respect to the outer peripheral surface of the leading end portion 10) in such a manner as to prevent a rear end surface 41a from protruding to the hole 27, in place of the projection portion 26.

Even in the third embodiment having the structure mentioned above, approximately the same operations and effects as the first embodiment can be expected.

FIG. 19 is a plan view showing a container main body which constructs a cosmetic material container in accordance with a fourth embodiment of the present invention, and FIG. 20 is a view as seen from an arrow XX-XX in FIG. 19.

A container main body 4 in accordance with the fourth embodiment is different from the container main body 3 in accordance the third embodiment in a point that it employs a projection portion 42 in which a rear end surface 42a warps (inclines) somewhat forward than the rear end surface 41a of the projection portion 41, in place of the projection portion 41.

Even in the fourth embodiment having the structure mentioned above, approximately the same operations and effects as the third embodiment can be achieved.

FIG. 21 is a vertical cross sectional view showing a cosmetic material container in accordance with a fifth embodiment of the present invention.

A cosmetic material container 101 in accordance with the fifth embodiment is different from the cosmetic material container 100 in accordance with the first embodiment in a point that the cap 50 is replaced by a cap 60 for securing an air tightness, and an airtight plug 55 is provided within the leading end portion 10 of the container main body 1.

The cap 60 is structured such that a cylindrical inner cap 61 is provided in a rising manner in an inner surface of a bottom portion of the cap 50 in accordance with the first embodiment. The inner cap 61 is constructed by a flexible material, for example, a synthetic resin or the like, and may be formed integrally with the other portions of the cap 60 or may be firmly fixed to the bottom portion as an independent part. Further, if the cap 60 is installed to the container main body 1, an inner peripheral surface in an opening end side of the inner cap 61 comes into contact with an outer peripheral surface in a leading end side of the leading end portion 10 of the container main body 1 so as to be closely attached.

Further, the airtight plug 55 is arranged within the third hole 17, and is specifically arranged in such a manner that an outer peripheral surface is closely attached to the inner peripheral surface of the third hole 17, and a surface in the leading end side is closely attached to a step surface 49 between the rear end of the second hole 16 and the front end of the third hole 17.

In the fifth embodiment mentioned above, if the cap 60 is installed to the container main body 1, the inner peripheral surface in the opening end side of the inner cap 61 is closely attached to the outer peripheral surface of the leading end portion 10. Accordingly, an area between the closely attached portion and the airtight plug 55 is sealed with respect to the other areas than this. Therefore, in the case that the rod-like cosmetic material M is volatile, it is possible to particularly prevent a volatilization thereof.

In this case, the cap 60 mentioned above can be of course applied to the cosmetic material containers in accordance with the second to fourth embodiments.

The description is given above specifically of the present invention on the basis of the embodiments, however, the present invention is not limited to the embodiments mentioned above, for example, in the embodiments, the number of the projections 26 and 40 to 42 are particularly preferably set to three, however, it may be set to one or four or more.

Further, in the embodiments mentioned above, the rod-like cosmetic material M is made immovable in the axial direction with respect to the container main bodies 1 to 4, however, it is possible to apply to a cosmetic material container which has a delivery mechanism, for example, a screw engaging mechanism or the like and can freely rise and set the rod-like cosmetic material M with respect to the container main bodies 1 to 4 by the mechanism. Further, it is possible to apply to a liquid cosmetic material container which is used by incorporating a liquid cosmetic material and pressing out by a finger or a pressing mechanism, on the basis of an installation of a cylinder body which closes only the inner portion of the hole 27 so as to prevent a leak form the hole 27, within a tube corresponding to the hole 27 of the container main bodies 1 to 4.

What is claimed is:

1. A cosmetic material container comprising:
    a tubular container main body having a leading end portion in which a cosmetic material appears from an opening in a leading end thereof; and an expanded portion extending from a rear side of the leading end, said leading end and said expanded portion being formed integrally with each other; and
    a closed-end tubular cap which is detachably engageable with the container main body in such a manner as to cover the leading end portion,
    wherein the leading end portion comprises a thin tube portion having a large diameter inner surface, and a thick tube portion having a small diameter inner surface, such that the thin tube portion and the thick tube portion are alternately arranged along a peripheral direction,
    wherein the thin tube portion of the leading end portion of the container main body is provided with at least one projection portion provided on an outer peripheral surface and protrudes outward, and at least one hole provided adjacent to a rear side in an axial direction of each projection portion, and communicates inner and outer sides of the tube,
    wherein said expanded portion of said tubular container main body is provided continuously with a rear side in the axial direction of the holes, and is extended rearward such that inner and outer diameters of the tube are equal to or more than an outer diameter of said projection portion,
    wherein the cap is provided with an annular projection which is detachably engageable with the projection portion in the axial direction, on an inner peripheral surface in the vicinity of an opening thereof, and
    wherein the leading end portion of the container main body is inserted to the opening of the cap, and the leading end portion is inserted to a position at which the projection portion of the container main body climbs over the annular projection of the cap, whereby the cap is detachably engaged with and installed to the container main body.

2. A cosmetic material container as claimed in claim 1, wherein the projection portion of the container main body protrudes to the hole.

3. A cosmetic container material as claimed in claim 1, wherein in the container main body, a thickness of a front side portion of the projection portion is smaller than a thickness of the other portions in both sides in a peripheral direction of the front side portion.

4. A cosmetic container material as claimed in claim 2, wherein in the container main body, a thickness of a front side portion of the projection portion is smaller than a thickness of the other portions in both sides in a peripheral direction of the front side portion.

* * * * *